(12) United States Patent
Polan et al.

(10) Patent No.: US 12,175,279 B2
(45) Date of Patent: Dec. 24, 2024

(54) DUAL STAGE BULKHEADS

(71) Applicant: Shopify Inc., Ottawa (CA)

(72) Inventors: Damian Arpad Polan, Ottawa (CA); Justin Li, Ottawa (CA)

(73) Assignee: Shopify Inc., Ottawa (CA)

( * ) Notice: Subject to any disclaimer, the term of this patent is extended or adjusted under 35 U.S.C. 154(b) by 461 days.

(21) Appl. No.: 17/695,949

(22) Filed: Mar. 16, 2022

(65) Prior Publication Data

US 2023/0297413 A1  Sep. 21, 2023

(51) Int. Cl.
*G06F 9/46* (2006.01)
(52) U.S. Cl.
CPC ..................... *G06F 9/46* (2013.01)
(58) Field of Classification Search
CPC .................... G06F 9/46; G06F 9/505
See application file for complete search history.

(56) References Cited

U.S. PATENT DOCUMENTS

| | | | | |
|---|---|---|---|---|
| 8,327,378 B1 * | 12/2012 | Vasanthakumari | ..... | G06F 9/485 718/100 |
| 9,553,951 B1 * | 1/2017 | Nguyen | ............... | H04L 67/125 |
| 2009/0259752 A1 * | 10/2009 | McNutt | ............... | H04L 67/1097 709/225 |
| 2013/0346587 A1 * | 12/2013 | Barkett | ................. | G06Q 50/01 709/224 |
| 2014/0108654 A1 * | 4/2014 | Zhang | ................... | H04L 65/612 709/224 |
| 2014/0122453 A1 * | 5/2014 | Gocek | .................. | G06F 16/217 707/704 |
| 2017/0235605 A1 * | 8/2017 | Chaloupka | ............ | G06F 9/4881 718/103 |

FOREIGN PATENT DOCUMENTS

CN   112631770 A  *  4/2021 ............ G06F 9/5011

OTHER PUBLICATIONS

PCT; Supplementary International Search Report relating to International Application No. PCT/CA2023/050113 dated Jun. 21, 2024.

* cited by examiner

*Primary Examiner* — Dong U Kim
(74) *Attorney, Agent, or Firm* — Rowand LLP

(57) ABSTRACT

Systems and methods for controlling access to services. Methods may comprise receiving, from a first client of a plurality of clients, a first request to access a first service of a plurality of services. The first service may be associated with a first bulkhead. A first count of concurrent active requests to the first service via the first bulkhead may be determined. If the first count is equal to a first bulkhead maximum value, access to the first service via the first bulkhead may consequently be refused. A second count of concurrent active requests via a shared burst bulkhead may be determined. The second count may correspond to concurrent active requests to any of the plurality of services via the shared burst bulkhead. If the second count is less than a shared burst maximum value, the first request to the first service may be routed via the shared burst bulkhead.

20 Claims, 10 Drawing Sheets

114

E-Commerce Platform

Q Search

⌂ Home
🗐 Orders
◇ Products
○○ Customers
📊 Reports
⊘ Discounts
⊞ Apps

SALES CHANNELS ⊕
▭ Online Store
▫ Mobile App
View all channels

⚙ Settings

JG John's Apparel
   Jonny B. Good

All channels ∨   Today ∨

Good afternoon, Jonny B..
Here's what's happening with your store today.

Today's total sales    Today's visits
$98.00                 1

● Update your Platform Payments tax details
  We require additional information to verify your identity.
  [Update tax details]

● Advanced Cash on Delivery has been deactivated for your store
  [See why]

TOTAL SALES
$98.00

$125
$75
$25
      12am      8pm    4pm   Jun 1
                             2 orders
                       11pm TOTAL SALES BY CHANNEL    View dashboard Online Store              Jun 1
$0.00                     0 orders Mobile app
$0.00                     0 orders Shopify POS (126 York St.)
$0.00                     0 orders

FIG. 11

DUAL STAGE BULKHEADS

FIELD

The present disclosure relates to single-threaded process software architecture and, in particular, to systems and methods for efficient distribution of workers or clients among database services.

BACKGROUND

A web-based platform may be implemented using one of two different architectures: a single-threaded process architecture or a multi-threaded process architecture. Each architecture has advantages and disadvantages. A multi-threaded architecture may be advantageous in some respects, but context switching between threads can be computationally expensive. A single-threaded process architecture avoids the context-switching issue, but can also result in latency problems if blocking on input/output results in long delays in servicing requests or failed/timed-out requests.

BRIEF DESCRIPTION OF THE DRAWINGS

Embodiments will be described, by way of example only, with reference to the accompanying figures wherein:

FIG. 11 is an example of a home page of an administrator, in accordance with an example embodiment.

Like reference numerals are used in the drawings to denote like elements and features.

DETAILED DESCRIPTION OF EMBODIMENTS

Figure 1:
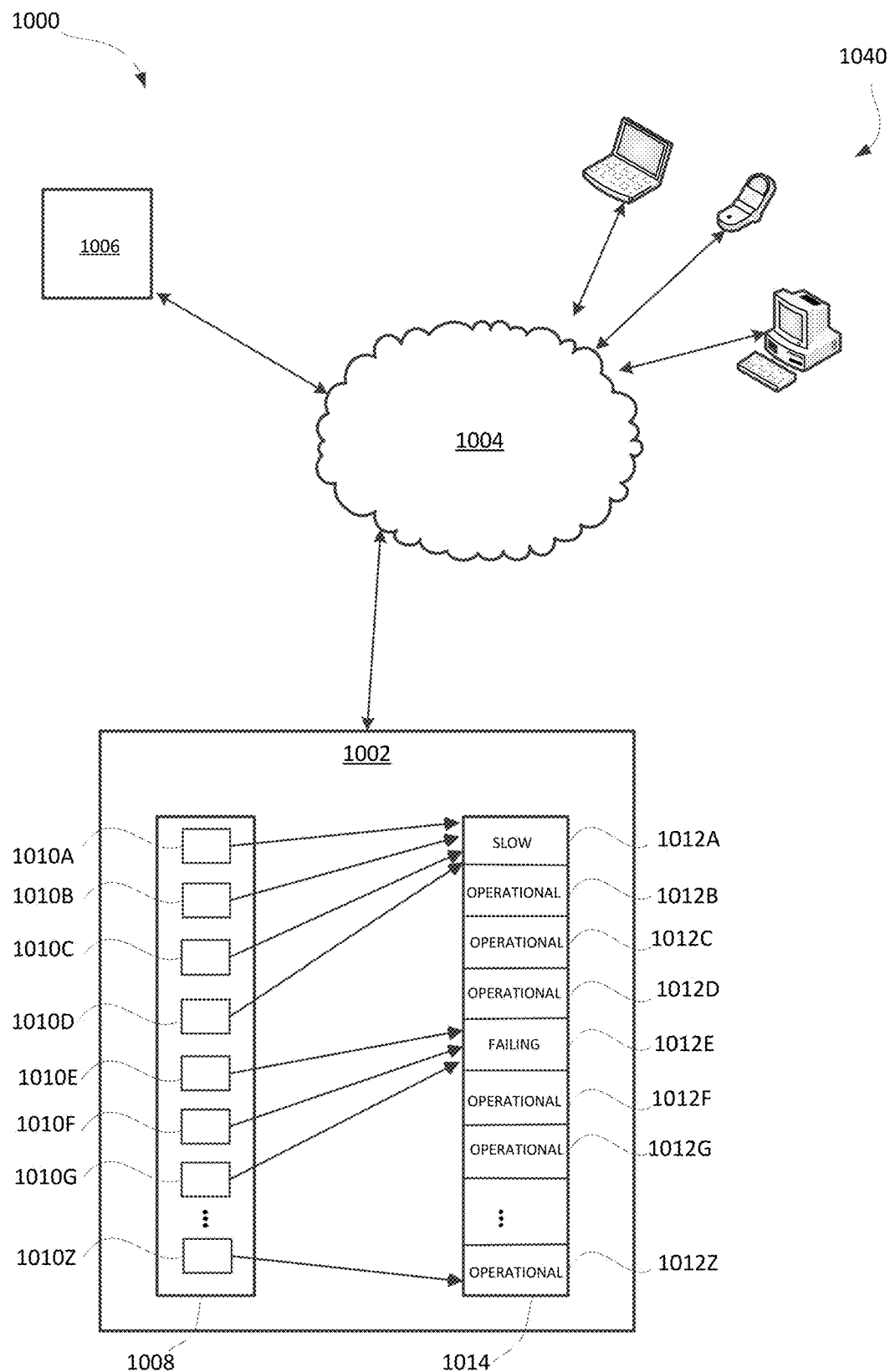
FIG. 1 is a simplified example system.

In an aspect, the present application discloses a computer-implemented method for controlling access to services. The method includes: receiving, from a first client of a plurality of clients, a first request to access a first service of a plurality of services, the first service associated with a first bulkhead; determining that a first count of concurrent active requests to the first service via the first bulkhead is equal to a first bulkhead maximum value and consequently refusing access to the first service via the first bulkhead; and responsive to determining that the first count of concurrent active requests to the first service via the first bulkhead is equal to the first bulkhead maximum value: determining that a second count of concurrent active requests via a shared burst bulkhead is less than a shared burst maximum value, the second count of concurrent active requests corresponding to concurrent active requests to any of the plurality of services via the shared burst bulkhead; and, responsive to determining that the second count of concurrent active requests to any of the plurality of services via the shared burst bulkhead is less than the shared burst maximum value: routing the first request to the first service via the shared burst bulkhead.

In some implementations, the first bulkhead maximum value represents a number of first bulkhead tickets available for active requests to the first service via the first bulkhead; the shared burst maximum value represents a number of shared burst tickets available for active requests to any of the plurality of services via the shared burst bulkhead; determining that a first count of concurrent active requests to the first service via the first bulkhead is equal to a first bulkhead maximum value includes determining that all of the first bulkhead tickets are reserved; and determining that a second count of concurrent active requests to any of the plurality of services via a shared burst bulkhead is less than a shared burst maximum value includes determining whether there is at least one shared burst bulkhead ticket available.

In some implementations, routing the first request to the first service via the shared burst bulkhead includes reserving one of the at least one shared burst bulkhead tickets by the first request.

In some implementations, the method further includes receiving notification that the first request has been completed; and releasing said one of the at least one shared burst bulkhead tickets.

In some implementations, the method further includes receiving, from a second client of a plurality of clients, a second request to access a second service having a second bulkhead associated with the second service; determining that a first count of concurrent active requests to the second service via the second bulkhead is less than a second bulkhead maximum value; and, in response, routing the second request to the second service via the second bulkhead.

In some implementations, the method further includes receiving, from a second client of a plurality of clients, a second request to access a second service having a second bulkhead associated with the second service; determining that a first count of concurrent active requests to the second service via the second bulkhead is less than a second bulkhead maximum value; and, in response, routing the second request to the second service via the second bulkhead; wherein routing the second request to the second service via the second bulkhead includes reserving a second shared burst bulkhead ticket by the second request.

In some implementations, the method further includes receiving, from a third client of the plurality of clients, a third request to access the first service; determining that the first count of concurrent active requests to the first service via the first bulkhead is equal to the first bulkhead maximum value and consequently refusing access to the first service via the first bulkhead; and responsive to determining that the first count of concurrent active requests to the first service via the first bulkhead is equal to the first bulkhead maximum value: determining that the second count of concurrent active requests via the shared burst bulkhead is equal to the shared burst maximum value and consequently refusing access to the first service via the shared burst bulkhead; and responsive to determining that the second count of concurrent active requests via the shared burst bulkhead is equal to the shared burst maximum value: refusing the third request to access the first service.

In some implementations, the method further includes receiving, from the third client of the plurality of clients, a fourth request to access the first service; determining that the first count of concurrent active requests to the first service via the first bulkhead is equal to the first bulkhead maximum value and consequently refusing access to the first service via the first bulkhead; and responsive to determining that the first count of concurrent active requests to the first service via the first bulkhead is equal to the first bulkhead maximum value: determining that the second count of concurrent active requests via the shared burst bulkhead is less than the shared burst maximum value; and, responsive to determining that the second count of concurrent active requests via the shared burst bulkhead is less than the shared burst maximum value: routing the fourth request to the first service via the shared burst bulkhead; determining, after a time period, that the fourth request to access the first service has been unable to connect with the first service; and responsive to determining, after a time period, that the fourth request to access the first service has been unable to connect with the first service: refusing the fourth request to access the first service.

In some implementations, the method operates as a single-threaded process.

In some implementations, the first bulkhead maximum value represents an initial value of a first bulkhead counting semaphore; the shared burst maximum value represents an initial value of a shared burst counting semaphore; determining that a first count of concurrent active requests to the first service via the first bulkhead is equal to a first bulkhead maximum value includes determining that a current value of the first bulkhead counting semaphore is equal to zero; and determining that a second count of concurrent active requests to any of the plurality of services via a shared burst bulkhead is less than a shared burst maximum value includes determining that a current value of the shared burst counting semaphore value is greater than zero.

In another aspect, the present application discloses a computing system. The computing system comprises a processor; a memory coupled to the processor, the memory storing computer-executable instructions that, when executed, configure the processor to: receive, from a first client of a plurality of clients, a first request to access a first service of a plurality of services, the first service associated with a first bulkhead; determine that a first count of concurrent active requests to the first service via the first bulkhead is equal to a first bulkhead maximum value and consequently refusing access to the first service via the first bulkhead; and responsive to determining that the first count of concurrent active requests to the first service via the first bulkhead is equal to the first bulkhead maximum value: determine that a second count of concurrent active requests via a shared burst bulkhead is less than a shared burst maximum value, the second count of concurrent active requests corresponding to concurrent active requests to any of the plurality of services via the shared burst bulkhead; and, responsive to determining that the second count of concurrent active requests to any of the plurality of services via the shared burst bulkhead is less than the shared burst maximum value: route the first request to the first service via the shared burst bulkhead.

In some implementations, the first bulkhead maximum value represents a number of first bulkhead tickets available for active requests to the first service via the first bulkhead; the shared burst maximum value represents a number of shared burst tickets available for active requests to any of the plurality of services via the shared burst bulkhead; determining that a first count of concurrent active requests to the first service via the first bulkhead is equal to a first bulkhead maximum value includes determining that all of the first bulkhead tickets are reserved; and determining that a second count of concurrent active requests to any of the plurality of services via a shared burst bulkhead is less than a shared burst maximum value includes determining whether there is at least one shared burst bulkhead ticket available.

In some implementations, routing the first request to the first service via the shared burst bulkhead includes reserving one of the at least one shared burst bulkhead tickets by the first request.

In some implementations, the instructions, when executed, further configure the processor to receive notification that the first request has been completed and release said one of the at least one shared burst bulkhead tickets.

In some implementations, the instructions, when executed, further configure the processor to: receive, from a second client of a plurality of clients, a second request to access a second service having a second bulkhead associated with the second service; determine that a first count of concurrent active requests to the second service via the second bulkhead is less than a second bulkhead maximum value; and, in response, route the second request to the second service via the second bulkhead.

In some implementations, the instructions, when executed, further configure the processor to: receive, from a second client of a plurality of clients, a second request to access a second service having a second bulkhead associated with the second service; determine that a first count of concurrent active requests to the second service via the second bulkhead is less than a second bulkhead maximum value; and, in response, route the second request to the second service via the second bulkhead; wherein routing the second request to the second service via the second bulkhead includes reserving a second shared burst bulkhead ticket by the second request.

In some implementations, the instructions, when executed, further configure the processor to: receive, from a third client of the plurality of clients, a third request to access the first service; determine that the first count of concurrent active requests to the first service via the first bulkhead is equal to the first bulkhead maximum value and consequently refusing access to the first service via the first bulkhead; and responsive to determining that the first count of concurrent active requests to the first service via the first bulkhead is equal to the first bulkhead maximum value: determine that the second count of concurrent active requests via the shared burst bulkhead is equal to the shared burst maximum value and consequently refusing access to the first service via the shared burst bulkhead; and responsive to determining that the second count of concurrent active requests via the shared burst bulkhead is equal to the shared burst maximum value: refuse the third request to access the first service.

In some implementations, the instructions, when executed, further configure the processor to: receive, from the third client of the plurality of clients, a fourth request to access the first service; determine that the first count of concurrent active requests to the first service via the first bulkhead is equal to the first bulkhead maximum value and consequently refusing access to the first service via the first bulkhead; and responsive to determining that the first count of concurrent active requests to the first service via the first bulkhead is equal to the first bulkhead maximum value: determine that the second count of concurrent active requests via the shared burst bulkhead is less than the shared burst maximum value; and, responsive to determining that the second count of concurrent active requests via the shared burst bulkhead is less than the shared burst maximum value: route the fourth request to the first service via the shared burst bulkhead; determine, after a time period, that the fourth request to access the first service has been unable to connect with the first service; and responsive to determining, after a time period, that the fourth request to access the first service has been unable to connect with the first service: refuse the fourth request to access the first service.

In some implementations, the first bulkhead maximum value represents an initial value of a first bulkhead counting semaphore; the shared burst maximum value represents an initial value of a shared burst counting semaphore; determining that a first count of concurrent active requests to the first service via the first bulkhead is equal to a first bulkhead maximum value includes determining that a current value of the first bulkhead counting semaphore is equal to zero; and determining that a second count of concurrent active requests to any of the plurality of services via a shared burst bulkhead is less than a shared burst maximum value includes determining that a current value of the shared burst counting semaphore value is greater than zero.

In yet another aspect, the present application discloses a non-transitory, computer-readable medium. The non-transitory, computer-readable medium stores computer-executable instructions that, when executed by a processor, are to cause the processor to: receive, from a first client of a plurality of clients, a first request to access a first service of a plurality of services, the first service associated with a first bulkhead; determine that a first count of concurrent active requests to the first service via the first bulkhead is equal to a first bulkhead maximum value and consequently refusing access to the first service via the first bulkhead; and responsive to determining that the first count of concurrent active requests to the first service via the first bulkhead is equal to the first bulkhead maximum value: determine that a second count of concurrent active requests via a shared burst bulkhead is less than a shared burst maximum value, the second count of concurrent active requests corresponding to concurrent active requests to any of the plurality of services via the shared burst bulkhead; and, responsive to determining that the second count of concurrent active requests to any of the plurality of services via the shared burst bulkhead is less than the shared burst maximum value: route the first request to the first service via the shared burst bulkhead.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . and . . . " is intended to cover any one or more of the listed elements, including any one of the listed elements alone, any sub-combination, or all of the elements, without necessarily excluding any additional elements, and without necessarily requiring all of the elements.

In the present application, the term "e-commerce platform" refers broadly to a computerized system (or service, platform, etc.) that facilitates commercial transactions, namely buying and selling activities over a computer network (e.g., Internet). An e-commerce platform may, for example, be a free-standing online store, a social network, a social media platform, and the like. Customers can initiate transactions, and any associated payment requests, via an e-commerce platform, and the e-commerce platform may be equipped with transaction/payment processing components or delegate such processing activities to one or more third-party services. An e-commerce platform may be extendible by connecting one or more additional sales channels representing platforms where products can be sold. In particular, the sales channels may themselves be e-commerce platforms, such as Facebook Shops™, Amazon™, etc.

Reference is first made to FIG. 1, which diagrammatically illustrates a simplified example system 1000 in accordance with an aspect of the present application. The example system 1000 may include a web-based platform such as an e-commerce platform 1002. The e-commerce platform 1002 may provide for one or more online storefronts. One or more of those online storefronts may be configured by and administered using a user computing device, such a merchant device 1006. The one or more online storefronts may be browsable by a user computing device, such as a consumer device 1040. The merchant device 1006 and consumer devices 1040 connect to the e-commerce platform 1002 via one or more computing networks 1004, such as the Internet. The merchant device 1006 and consumer devices 1040 may include any suitable computing device with at least a display screen and a user input device, such as a mobile smartphone, tablet, laptop, desktop, or other such devices.

The e-commerce platform 1002 may be implemented as or using one or more individual servers 1008. The one or more individual servers 1008 may be known as pods or machines. A pod may represent a physical machine, a virtual machine, and/or a virtualized container. Each server 1008 may host a plurality of processes 1010A-Z. The plurality of processes 1010A-Z may be known as workers or clients. The plurality of processes 1010A-Z may receive requests from external devices, such as web browsers operating on consumer devices 1040. In generating and in servicing these requests from external devices, the plurality of processes 1010A-Z may send requests to back-end services 1014 supported by the e-commerce platform 1002. Examples of back-end services 1014 supported by the e-commerce platform 1002 include Structured Query Language (SQL) services and/or Redis services.

The e-commerce platform 1002 may allocate back-end services 1010 to online storefronts by partitioning back-end services 1010 into subsets known as shards 1012A-Z. Each shard 1012A-Z may support a group of online storefronts.

Each particular shard 1012A-Z is indicated by its status. The first shard 1012A is shown as "SLOW", the fifth shard 1012E is shown as "FAILING", and the remaining illustrated shards 1012BCD, 1012FG and 1012Z are shown as "OPERATIONAL". The first shard 1012A is shown as receiving four active requests: one request from each of the first four processes 1010A-D. The fifth shard 1012E is shown as receiving three concurrent active requests: one request from each of the fifth, sixth and seventh processes 1010E-G. The last shard is shown as currently receiving one active request from the last process 1010Z. The remaining illustrated shards 1012CD and 1012FG are shown as currently not receiving any active requests.

In a normal request flow, there may be zero, one, two or more processes 1010A-Z sending requests and awaiting a response from a particular shard 1012A-Z. When a particular shard 1012A-Z is slow or failing, each request received by the particular shard 1012A-Z from a process 1010A-Z may take a longer-than-normal time to complete or may time-out. As more requests are received by slow or failing shards 1012A-Z, more and more processes 1010A-Z may be tied up awaiting responses from the slow or failing shards 1012A-Z. For example, as shown in FIG. 1, shards 1012A and 1012E are slow or failing, and as a result, processes 1010A-D and 1010E-G are occupied awaiting responses from those shards 1012A and 1012E. As a result, fewer processes 1010A-Z may remain available to process requests to the operational shards 1012B-D, 1012FG and 1012Z. For example, requests from external devices to access operational shards 1012B-D, 1012FG and 1012Z may be unable to be serviced by the server 1008 due to the unavailability of processes 1010A-Z. Accordingly, those external devices may see delays in obtaining data reliant upon the slow or failing shards 1012A and 1012E and may experience delays in obtaining data reliant upon operational shards 1012B-D, 1012FG and 1012Z.

In order to address this problem, the concepts of bulkheading and circuit-breaking have been introduced.

Bulkheads

A bulkhead is a mechanism for restricting the number of processes that are in communication with the database services of a single shard. This mechanism may take the form of a set of limits represented by a set of counting semaphores, which are variables that count down from an initial value to keep track of the number of clients per shard. A bulkhead may exist within the context of a single machine or pod. Each counting semaphore may be visualized as a shard counter tracking the number of processes per shard versus a maximum permitted number of processes per shard. Alternatively, each counting semaphore may be visualized as a number of tickets equal to the maximum number of processes (bulkhead value) that are available to each shard. The limit, represented by the initial value of the counting semaphore, the maximum permitted number of processes per shard and by the maximum number of tickets, may be referred to as a first bulkhead maximum value.

Figure 2:
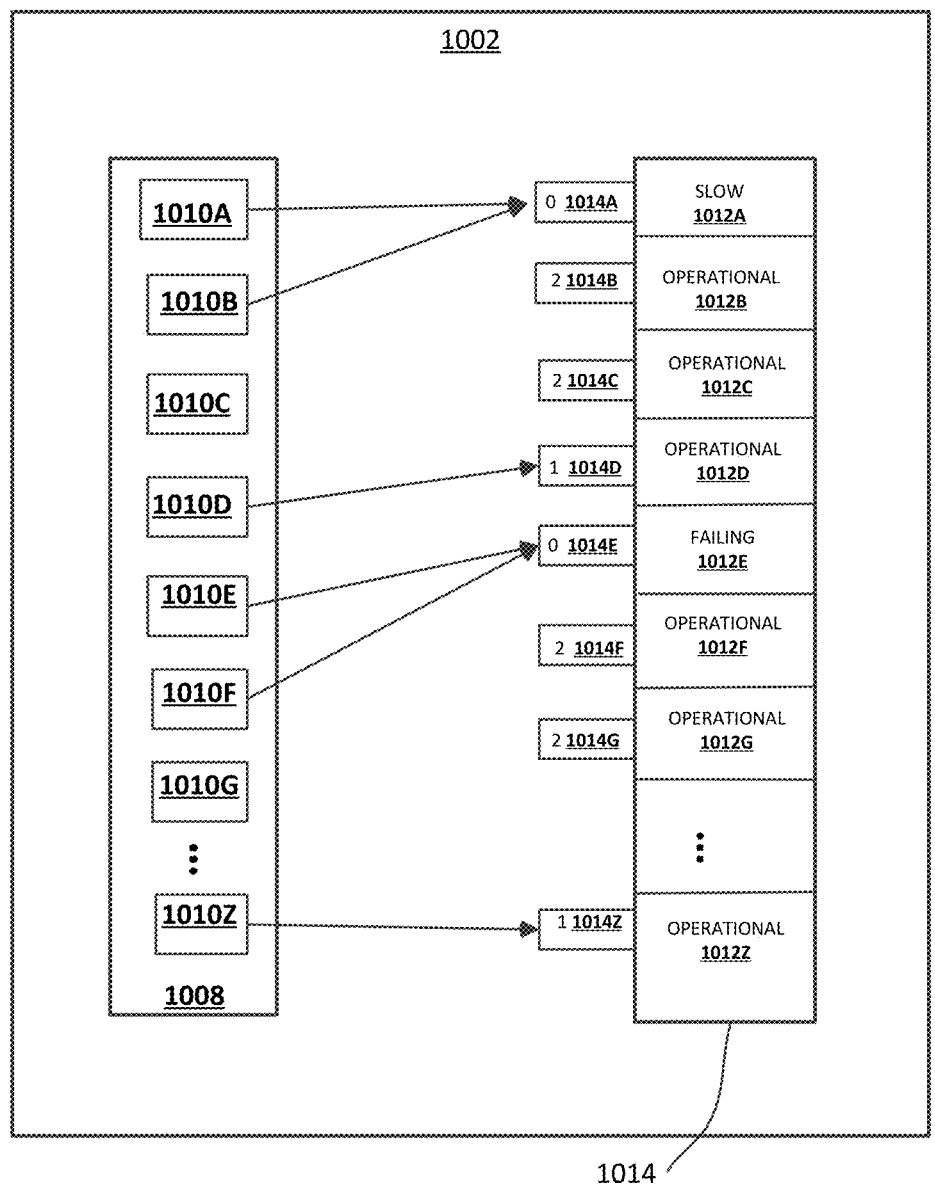
FIG. 2 is a block diagram of an e-commerce platform that is configured for implementing example embodiments of FIG. 1, in accordance with an aspect of the present application.

Reference is now made to FIG. 2, which diagrammatically illustrates an example of the simplified e-commerce platform 1002 shown in FIG. 1, in accordance with an aspect of the present application. The example of FIG. 2 illustrates a series of first-level bulkheads 1014A-Z having a maximum value equal to two, meaning that a maximum of two concurrent active requests per shard 1012A-Z are permitted. Each particular shard 1012A-Z is indicated by its status. The first shard 1012A is shown as "SLOW", the fifth shard 1012E is shown as "FAILING", and the remaining illustrated shards 1012BCD, 1012FG and 1012Z are shown as "OPERATIONAL". The first and fifth shards 1012A, 1012E are each shown as receiving two concurrent active requests: the first shard 1012A from the first and second processes 1010AB and the fifth shard 1012E from the fifth and sixth processes 1010EF. Two of the shards 1012A-Z are each shown as currently receiving one active request: the fourth shard 1012D from the fourth process 1010A, and the last shard 1012Z from the last process 1014Z. Four of the shards 1012A-Z are shown as not currently receiving requests: the third shard 1012C and the sixth shard 1012F. Two of the processes 1010A-Z are shown as idle: the third process 1010C and the seventh process 1010G.

First-level bulkheads 1014A-Z are illustrated adjacent their respective shards 1012A-Z. The remaining availability of concurrent active requests for each particular shard 1012A-Z are indicated within the respective first-level bulkheads 1014A-Z. Accordingly, the first and fifth first-level bulkheads 1014AE indicate a remaining availability of zero concurrent active requests (i.e. zero tickets remaining); the fourth and last first-level bulkheads 1014DZ indicate a remaining availability of one concurrent active request (i.e. one ticket remaining); and the second, third, sixth, and seventh first-level bulkheads 1014BC, 1014FG indicate a remaining availability of two active requests (i.e. two tickets remaining).

As noted, in this example, the first-level bulkhead maximum value is equal to 2, meaning that a maximum of 2 concurrent active requests per shard 1012A-Z are permitted. Once a count of concurrent active requests to a particular shard 1012A-Z is equal to the first-level bulkhead maximum value of 2, the corresponding first-level bulkhead 1014A-Z may refuse any subsequent communication from additional processes to this shard 1012A-Z. Subsequently, when an active request has been completed, the corresponding first-level bulkhead 1014A-Z may allow another request to the shard 1012A-Z.

In other words, there are two available tickets per shard 1012A-Z. Once both of the tickets of a particular shard 1012A-Z have been reserved, the corresponding first-level bulkhead 1014A-Z may refuse any subsequent communication from additional processes to this particular shard 1012A-Z. Subsequently, when an active request associated with the particular shard 1012A-Z has been completed, the corresponding first-level bulkhead 1014A-Z may release the associated ticket so that the ticket becomes available to be reserved by another process 1010A-Z.

As noted, the first and the fifth shards 1012A, 1012E are shown having two concurrent active requests. As a result, the corresponding first-level bulkheads 1014A, 1014E indicate that the remaining availability of concurrent active requests for these shards is 0. As a result, the first and the fifth first-level bulkheads 1014A, 1014E are currently refusing any additional requests from any of the processes 1010A-Z to the corresponding first and fifth shards 1012A, 1012E, which represent slow and failing services. In this way, a slow or failing service is prevented from occupying too many processes 1010A-Z which might otherwise be sending and receiving communications with shards 1012A-Z that are operating normally.

It can be challenging to configure an optimal first-level bulkhead maximum value. For example, during high-use times, such as during a flash sale at an online storefront, a shard 1012A-Z may have a legitimate need to communicate with a higher than normal number of processes 1010A-Z. Therefore, an optimal first-level bulkhead maximum value should provide maximum availability during high-use times while still preventing excessive hoarding of processes 1010A-Z by slow or failing shards 1012A-Z. One possible first-level bulkhead configuration is to set the first-level bulkhead maximum value to be equal to 50% of the number of processes 1010A-Z (assuming each shard 1012A-Z has the capacity to handle that many concurrent active requests). In an example involving a total of 90 processes 1010A-Z on a server 1008, this configuration would result in 45 tickets per shard 1012A-Z.

One problem with this first-level bulkhead configuration is that it may result in as few as two malfunctioning shards 1012A-Z reserving nearly all of the available processes 1010A-Z. An improved situation would allow for the remaining shards 1012A-Z to serve requests from the available processes 1010A-Z even when multiple shards 1012A-Z are malfunctioning. However, reducing the first-level bulkhead maximum value may prevent a shard 1012A-Z from operating at its full capacity (e.g. serving as many requests as possible from processes 1010A-Z during times of legitimate necessity, such as during a flash sale).

Shared Burst Bulkhead

As a solution to the limitations of the first-level bulkhead, a shared burst bulkhead is disclosed. A shared burst bulkhead is configured to supplement a set of first-level bulkhead tickets with a number of shared burst tickets. The pool of shared burst tickets may be used by a process to access any particular shard once the particular shard's first-level tickets have been reserved. The maximum number of shared burst tickets may be referred to as the shared burst maximum value.

Figure 3:
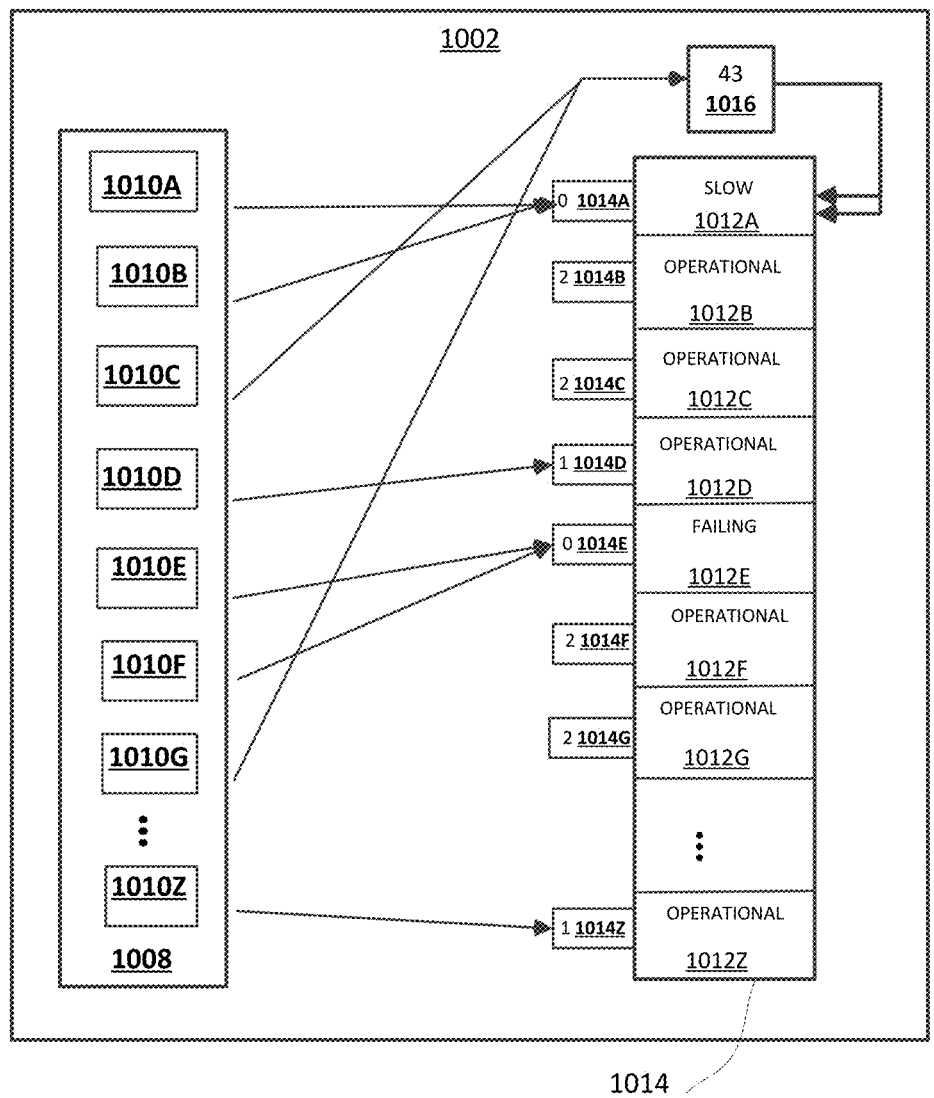
FIG. 3 is a block diagram of an e-commerce platform that is configured for implementing example embodiments of FIG. 1, in accordance with an aspect of the present application.

Reference is now made to FIG. 3, which diagrammatically illustrates an example of the simplified e-commerce platform 1002 shown in FIG. 1 and FIG. 2, in accordance with an aspect of the present application. As was shown in FIG. 2, FIG. 3 illustrates a series of first-level bulkheads 1014A-Z having a maximum value equal to 2, meaning that a maximum of 2 concurrent active requests per shard 1012A-Z are permitted. Each particular shard 1012A-Z is indicated by its status. The first shard 1012A is shown as "SLOW", the fifth shard 1012E is shown as "FAILING", and the remaining shards 1012 BCDFZ are shown as "OPERATIONAL". The first and fifth shards 1012A and 1012E are each shown as receiving two concurrent active requests through their respective first-level bulkheads 1014A-Z: the first shard 1012A from the first and second processes 1010AB and the fifth shard 1012E from the fifth and sixth processes 1010EF. Two of the shards 1012A-Z are each shown as currently receiving one active request through their respective first-level bulkheads 1014A-Z: the fourth shard 1012D from the fourth process 1010D, and the last shard 1012Z from the last process 1010Z. One of the shards 1012A-Z is shown as currently receiving one active request through its respective first-level bulkhead 1014A-Z: the fourth shard 1012D from the fourth process 1010D. Four of the shards 1012A-Z are shown as not currently receiving requests: the second shard 1012B, the third shard 1012C, and the sixth shard 1012F and the seventh shard 1012G.

FIG. 3 illustrates a shared burst bulkhead 1016. In this example, the shared burst maximum value is 45, meaning that the shared burst bulkhead provides a maximum of 45 shared burst tickets. The shared burst bulkhead 1016 is shown channeling the third and seventh processes 1010CG to shard 1012A. As a result, the number "43" is indicated on the shared burst bulkhead 1016, representing the remaining amount of shared burst tickets. The example of FIG. 3 shows how the shared burst bulkhead 1016 may provide for the "SLOW", first shard 1012A to have four concurrent requests while permitting processes 1010A-Z to access the remaining shards 1012A-Z. Regardless of the number of shared burst tickets used by other shards 1012A-Z, each shard 1012A-Z maintains access to a minimum of two processes 1010A-Z via the first-level bulkhead 1014A-Z of the particular shard 1012A-Z.

A further example is considered involving a total of 90 clients on a server. In this further example, the first-level bulkhead maximum value is one, providing one first-level bulkhead ticket per shard, and the shared burst maximum value is 45, providing 45 shared burst tickets. As a result, the maximum number of clients that may communicate with a particular shard at once is 46 clients, which is equal to just over 50% of the total number of clients.

In this further example, even if one shard were to be in communication with the maximum number of 46 clients at once, each remaining shard would continue to have access to the one ticket allotted by the first-level bulkhead There are a number of advantages to the shared burst bulkhead. For example, first-level-only bulkhead configurations may allow each shard to consume up to 50% of the bulkhead maximum value, creating a potential for two failing shards to consume the entire process capacity. In contrast, the shared burst bulkhead may limit each shard to reserving tickets from a shared "bucket" of 50% of the total number of tickets, which may ensure that access to processes by all shards may be maintained. Using a shared burst bulkhead involving one server supporting 200 shards, it has been noted that sufficient processes continue to be available to service remaining shards when up to 10% of the 200 shards are failing. Thus, a shared burst bulkhead enables continued service from available shards despite multiple failing or busy shards.

Figure 4:
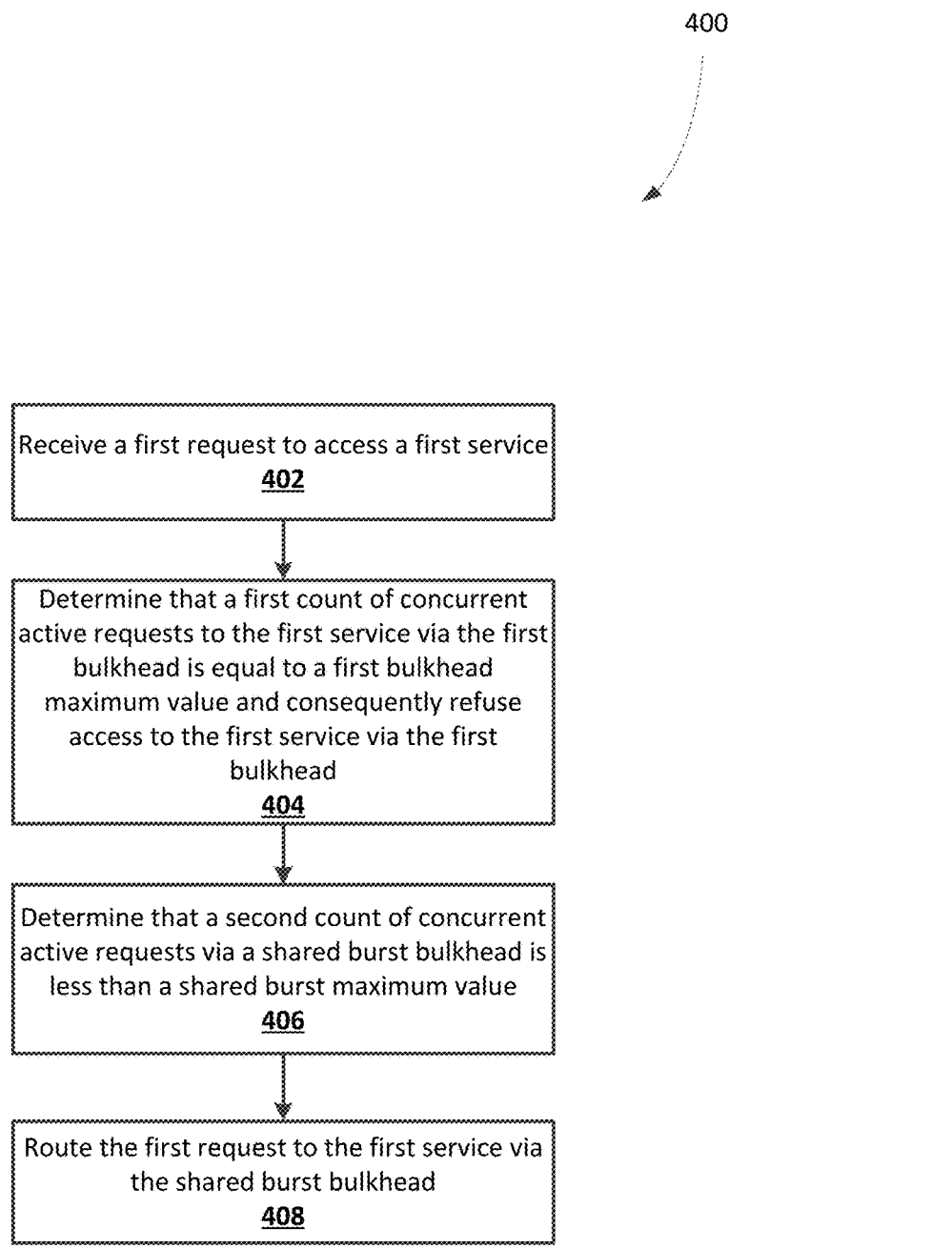
FIG. 4 shows, in flowchart form, an example method for controlling access to services, in accordance with an aspect of the present application.

Reference is now made to FIG. 4, which shows, in flowchart form, an example method 400 for controlling access to services. The method 400 may be performed by a computing system associated with an e-commerce platform, such as the e-commerce platform 1002 of FIG. 3.

At operation 402, a first request to access a first service is received. The first service is one of a plurality of services and may be associated with a first database shard of a plurality of database shards. The first request is received from a first client of a plurality of clients. The clients may also be described as processes or workers. The first service is associated with a first bulkhead, such as a first-level bulkhead associated with the first service.

At operation 404, a first count of concurrent active requests via the first bulkhead is determined to be equal to a first bulkhead maximum value. Consequently, access to the first service via the first bulkhead is refused.

Responsive to determining that the first count of concurrent active requests to the first service via the first bulkhead is equal to the first bulkhead maximum value, the method 400 proceeds to operation 406.

At operation 406, a second count of concurrent active requests via a shared burst bulkhead is determined to be less than a shared burst maximum value. The second count of concurrent active requests correspond to concurrent active requests to any of the plurality of services via the shared burst bulkhead.

Responsive to determining that the second count of concurrent active requests to any of the plurality of services via the shared burst bulkhead is less than the shared burst maximum value, the method proceeds to operation 408.

At operation 408, the first request is routed to the first service via the shared burst bulkhead.

Figure 5:
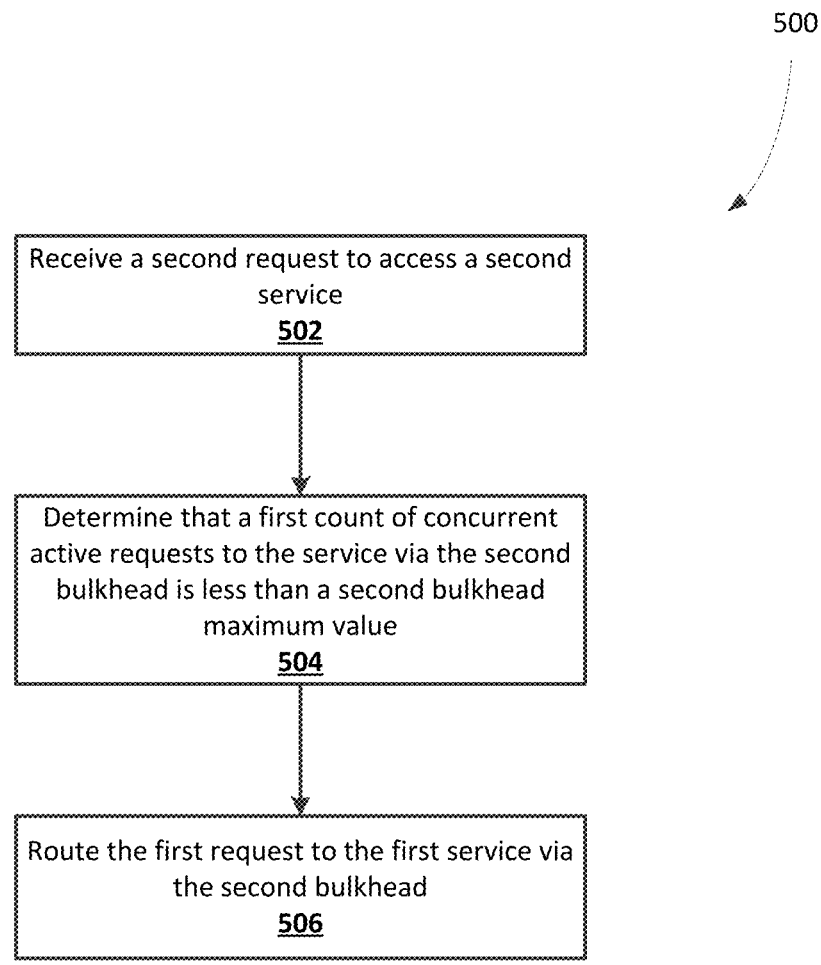
FIG. 5 shows, in flowchart form, another example method for controlling access to services, in accordance with an aspect of the present application.

Reference is now made to FIG. 5, which shows, in flowchart form, another example method 500 for controlling access to services. The method 500 may be performed by a computing system associated with an e-commerce platform, such as the e-commerce platform 1002 of FIG. 3.

At operation 502, a second request to access a second service is received. The second service is one of a plurality of services and may be associated with a second database shard of a plurality of database shards. The second request is received from a second client of a plurality of clients. The clients may also be described as processes or workers. The second service is associated with a second bulkhead, such as a first-level bulkhead associated with the second service.

At operation 504, a first count of concurrent active requests via the second bulkhead is determined to be less than a second bulkhead maximum value.

At operation 506, the second request is routed to the second service via the second bulkhead.

Figure 6:
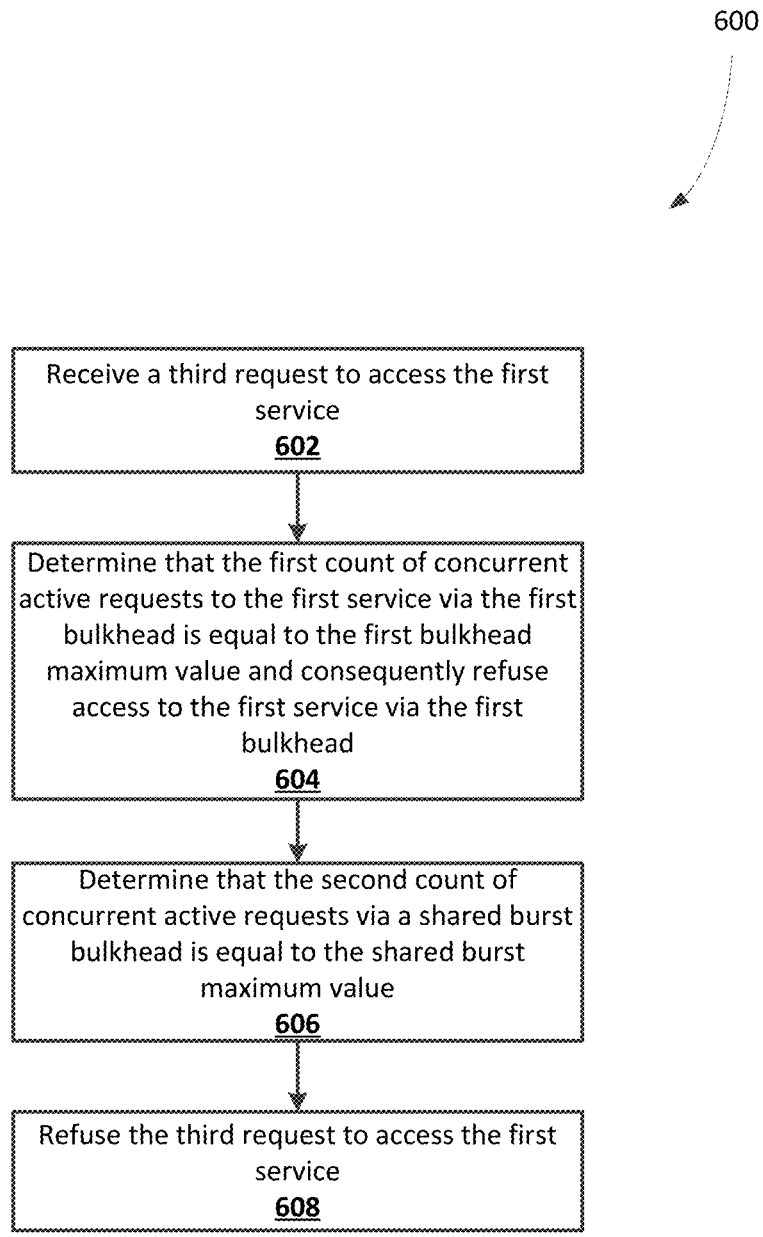
FIG. 6 shows, in flowchart form, yet another example method for controlling access to services, in accordance with an aspect of the present application.

Reference is now made to FIG. 6, which shows, in flowchart form, yet another example method 600 for controlling access to services. The method 600 may be performed by a computing system associated with an e-commerce platform, such as the e-commerce platform 1002 of FIG. 3.

At operation 602, a third request to access the first service is received. The first service is one of a plurality of services and may be associated with a first database shard of a plurality of database shards. The third request is received from a third client of a plurality of clients. The clients may also be described as processes or workers. The first service is associated with a first bulkhead, such as a first-level bulkhead associated with the first service.

At operation 604, a first count of concurrent active requests via the first bulkhead is determined to be equal to a first bulkhead maximum value. Consequently, access to the first service via the first bulkhead is refused.

Responsive to determining that the first count of concurrent active requests to the first service via the first bulkhead is equal to the first bulkhead maximum value, the method 600 proceeds to operation 606.

At operation 606, a second count of concurrent active requests via a shared burst bulkhead is determined to be equal to the shared burst maximum value. The second count of concurrent active requests correspond to concurrent active requests to any of the plurality of services via the shared burst bulkhead.

Responsive to determining that the second count of concurrent active requests to any of the plurality of services via the shared burst bulkhead is equal to the shared burst maximum value, the method 600 proceeds to operation 608.

At operation 608, the third request to access the first service is refused.

Circuit Breaker

A circuit breaker is a mechanism for restricting process access to a shard for a certain amount of time after the shard has exceeded a certain number of failures. In doing so, a circuit breaker seeks to prevent process resources from being spent waiting on a shard that is in a failure state.

A circuit may be in one of three states: closed, open or half-open. When a circuit is closed, the associated process may continue to send requests to the associated shard. When the circuit is open, the process is prevented from sending requests to the shard. After the circuit has been opened, the circuit breaker will periodically query the shard to see if the shard has returned to an operable state. In some cases, this is done by providing a request to the shard to see if the request fails. The circuit may be said to be in a "half-open" state while the shard is being queried in this manner. Once the circuit verifies that the shard is operable, the circuit closes, re-establishing access to the shard by the process.

There may be limitations to the use of circuit breakers in the absence of bulkheads. For example, if a circuit breaker for a shard is configured to enter the open state after X failures, and each request to the shard takes Y seconds, it may take up to X×Y seconds for the circuit breaker to enter the open state. During the time period of X×Y seconds, requests may continue to be directed to an unresponsive shard.

Circuit Breakers Triggered by Bulkheads

Circuit breakers may be used in combination with one or more bulkheads, such as a shared burst bulkhead. Use of one or more bulkheads with one or more circuit breakers may limit the number of requests directed to an unresponsive shard.

As noted, a circuit breaker is a mechanism for restricting process access to a shard for a certain amount of time after the shard has exceeded a certain number of failures. In some embodiments, bulkhead-related failures may not be considered by a circuit breaker in determining when to enter the open state. In some embodiments, bulkhead-related failures may be considered by a circuit breaker in determining when to enter the open state. In some embodiments, a circuit breaker may treat a failure caused by a shared burst bulkhead differently than a failure caused by a first-level bulkhead.

As previously described, when a process requests access to a shard and a ticket from a first-level bulkhead, and all of the first-level tickets have been reserved, the process may access the shard via the shared burst bulkhead. If a process requests a ticket from the pool of shared burst tickets and all of the shared burst tickets are in use, the shared burst bulkhead may interact with the associated circuit breaker in a number of ways. In some implementations where the circuit breaker is closed, the shared burst bulkhead may then set the associated circuit breaker to the open state. In some implementations where the circuit breaker is open, the shared burst bulkhead may then set the associated circuit breaker to the half-open state.

In implementations where the shared burst bulkhead sets the associated circuit breaker to the half-open state, the next request by the associated process to access the particular shard may determine whether the circuit will move to the closed state.

For example, a first process may request access to a first shard. At the time of the request, both the first bulkhead maximum value and the shared burst maximum value may have been reached. In some implementations, the shared burst bulkhead may then set the circuit breaker associated with the first process and the first shard to the half-open state.

After a period of time, a shared burst ticket may become available, and the first process may again request access to the first shard. In this event, the request may be allowed by the shared burst bulkhead. As the circuit breaker is now in the half-open state, the circuit breaker may accordingly monitor the first process to determine whether a connection can be made with the first shard within an established time period, (e.g., 200 ms). If the established time period elapses without a connection being made, the circuit breaker may then enter the open state. The first process is then prevented from connecting with the first server until the circuit breaker closes.

Referring again to FIG. 6, the method 600 includes operation 602 involving a third request to access the first service. As both the first bulkhead maximum value and the shared burst maximum value have been reached, the third request to access the first service is refused at operation 608. In some embodiments, a circuit breaker may be associated with the first service and the process making the third request. In some such embodiments, the refusal of the third request may result in setting the circuit breaker to the open state.

Figure 7:
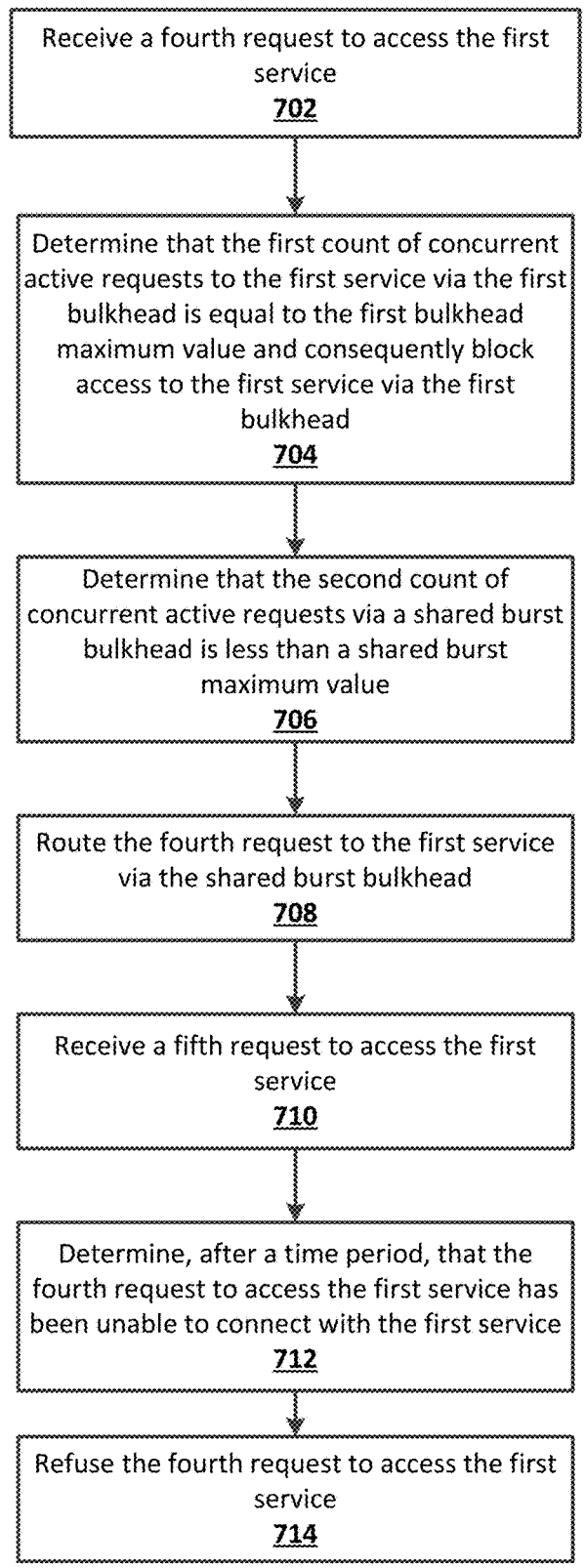
FIG. 7 shows, in flowchart form, still yet another example method for controlling access to services, in accordance with an aspect of the present application.

Reference is now made to FIG. 7, which shows, in flowchart form, an example method 700 for controlling access to services. The method 700 may be performed by a computing system associated with an e-commerce platform, such as the e-commerce platform 1002 of FIG. 3. The method 700 may be executed subsequent operations resulting in an associated circuit breaker, (i.e., the circuit breaker between the process making the fourth request and the first service), entering the half-open state.

At operation 702, a fourth request to access the first service is received. The first service is one of a plurality of services and may be associated with a first database shard of a plurality of database shards. The fourth request is received from the third client of a plurality of clients. The clients may also be described as processes or workers. The first service is associated with a first bulkhead, such as a first-level bulkhead associated with the first service.

At operation 704, a first count of concurrent active requests via the first bulkhead is determined to be equal to a first bulkhead maximum value. Consequently, access to the first service via the first bulkhead is refused.

Responsive to determining that the first count of concurrent active requests to the first service via the first bulkhead is equal to the first bulkhead maximum value, the method 700 proceeds to operation 706.

At operation 706, a second count of concurrent active requests via a shared burst bulkhead is determined to be less than the shared burst maximum value. The second count of concurrent active requests corresponds to concurrent active requests to any of the plurality of services via the shared burst bulkhead.

Responsive to determining that the second count of concurrent active requests to any of the plurality of services via the shared burst bulkhead is less than the shared burst maximum value, the method 700 proceeds to operation 708.

At operation 708, the fourth request to the first service is routed via the shared burst bulkhead.

At operation 710, a fifth request to access the first service is received. The first service is one of a plurality of services and may be associated with a first database shard of a plurality of database shards. The fifth request is received from the third client of a plurality of clients.

At operation 712, the method determines, after a time period, that the fourth request to access the first service has been unable to connect with the first service. The time period may be an established time period of the associated circuit breaker.

Responsive to determining, after a time period, that the fourth request to access the first service has been unable to connect with the first service, the method 700 proceeds to operation 714.

At operation 714, the fifth request to access the first service is refused.

In any of the above-described example methods or processes it will be understood that certain operations described as occurring in sequence may be implemented in a different sequence or carried out in parallel without impacting the overall functioning of the method or process.

Figure 8:
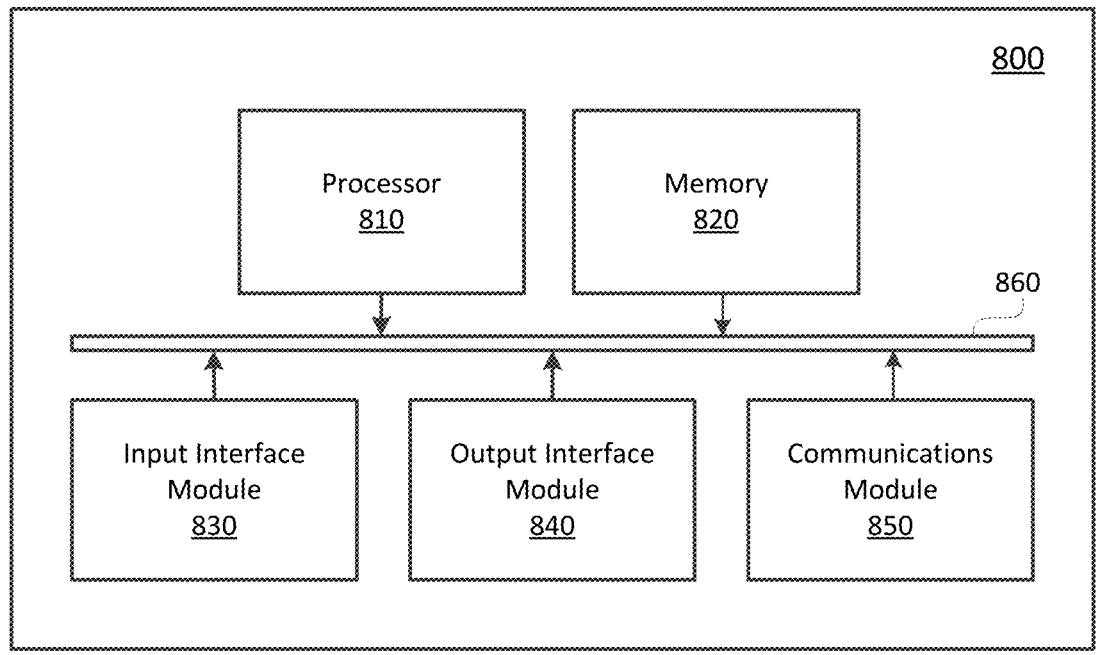
FIG. 8 is a high-level schematic diagram of a computing device.

Many of the above-described methods may be implemented by way of suitably-programmed computing device. FIG. 8 is a high-level diagram of an example computing device 800. The example computing device 800 includes a variety of modules. For example, the example computing device 800 may include a processor 810, a memory 820, an input interface module 830, an output interface module 840, and a communications module 850. As illustrated, the foregoing example modules of the example computing device 800 are in communication over a bus 860.

The processor 810 is a hardware processor. The processor 810 may, for example, be one or more ARM, Intel x86, PowerPC processors, or the like.

The memory 820 allows data to be stored and retrieved. The memory 820 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 800.

The input interface module 830 allows the example computing device 800 to receive input signals. Input signals may, for example, correspond to input received from a user. The input interface module 830 may serve to interconnect the example computing device 800 with one or more input devices. Input signals may be received from input devices by the input interface module 830. Input devices may, for example, include one or more of a touchscreen input, keyboard, trackball or the like. In some embodiments, all or a portion of the input interface module 830 may be integrated with an input device. For example, the input interface module 830 may be integrated with one of the aforementioned example input devices.

The output interface module 840 allows the example computing device 800 to provide output signals. Some output signals may, for example, allow provision of output to a user. The output interface module 840 may serve to interconnect the example computing device 800 with one or more output devices. Output signals may be sent to output devices by output interface module 840. Output devices may include, for example, a display screen such as, for example, a liquid crystal display (LCD), a touchscreen display. Additionally, or alternatively, output devices may include devices other than screens such as, for example, a speaker, indicator lamps (such as, for example, light-emitting diodes (LEDs)), and printers. In some embodiments, all or a portion of the output interface module 840 may be integrated with an output device. For example, the output interface module 840 may be integrated with one of the aforementioned example output devices.

The communications module 850 allows the example computing device 800 to communicate with other electronic devices and/or various communications networks. For example, the communications module 850 may allow the example computing device 800 to send or receive communications signals. Communications signals may be sent or received according to one or more protocols or according to one or more standards. For example, the communications module 850 may allow the example computing device 800 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 850 may allow the example computing device 800 to communicate using near-field communication (NFC), via Wi-Fi™, using Bluetooth™ or via some combination of one or more networks or protocols. Contactless payments may be made using NFC. In some embodiments, all or a portion of the communications module 850 may be integrated into a component of the example computing device 800. For example, the communications module may be integrated into a communications chipset.

Software comprising instructions is executed by the processor 810 from a computer-readable medium. For example, software may be loaded into random-access memory from persistent storage of memory 820. Additionally, or alternatively, instructions may be executed by the processor 810 directly from read-only memory of the memory 820.

Figure 9:
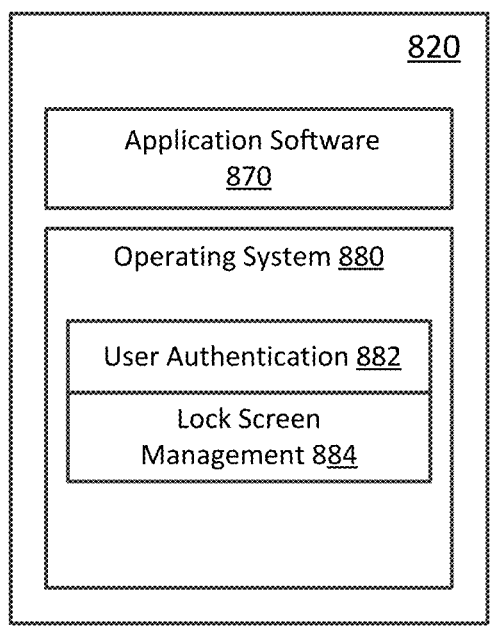
FIG. 9 shows a simplified organization of software components stored in a memory of the computing device of FIG. 8.

FIG. 9 depicts a simplified organization of software components stored in memory 820 of the example computing device 800. As illustrated, these software components include, at least, application software 870 and an operating system 880.

The application software 870 adapts the example computing device 800, in combination with the operating system 880, to operate as a device performing a particular function. While a single application software 870 is illustrated in FIG. 9, in operation, the memory 820 may include more than one application software and different application software may perform different operations.

The operating system 880 is software. The operating system 880 allows the application software 870 to access the processor 810, the memory 820, the input interface module 830, the output interface module 840 and the communications module 850. The operating system 880 may, for example, be iOS™, Android™, Linux™, Microsoft Windows™, or the like.

The operating system 880 provides various system services for the example computing device 800. User authentication services 882 includes a suite of services relating to credential enrollments and authentication of device users. For example, user authentication services 882 may include initial enrollment of credentials (e.g., PIN, pattern, password, or the like), credentials management, and processing of authentication tokens. Lock screen management services 884 relate to enabling, disabling, and modifying lock screens on the example computing device 800, and may include graphical user interface (GUI) control, display management, user input processing, and device unlock support.

One or more of the computing devices 800 may be used to implement the e-commerce platform 1002 (FIG. 1) in some examples. The merchant device 1006 (FIG. 1) and/or the customer device 1040 (FIG. 1) may be implemented by the computing device 800 in some cases.

Example E-Commerce Platform

Although not required, in some embodiments, the methods disclosed herein may be performed on or in association with an e-commerce platform. An example of an e-commerce platform will now be described.

Figure 10:
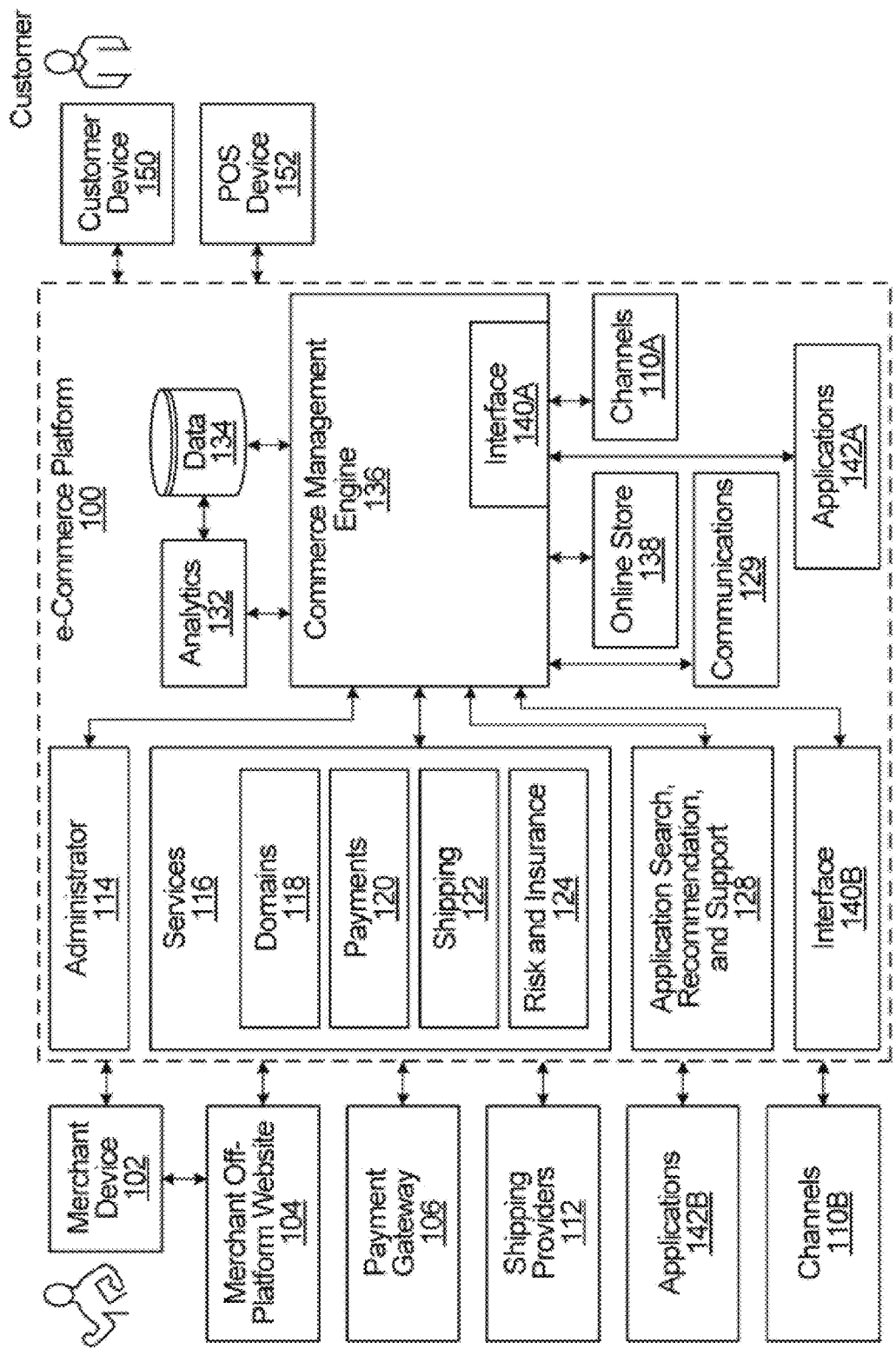
FIG. 10 is a block diagram of an e-commerce platform, in accordance with an example embodiment.

FIG. 10 illustrates an example e-commerce platform 100, according to one embodiment. The e-commerce platform 100 may be exemplary of the e-commerce platform 1002 described with reference to FIG. 1. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, additionally or alternatively, be provided by one or more providers/entities.

In the example of FIG. 10, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure, the terms online store and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a transitory memory such as for example, random access memory (RAM), and/or a non-transitory memory such as, for example, a non-transitory computer readable medium such as, for example, persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a virtual shopping cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product data. It may be that themes can be further customized through a theme editor, a design interface that enables users to customize their website's design with flexibility. Additionally, or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

FIG. 11 depicts anon-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 9. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. for example, contact information, billing information, shipping information, returns/refund information, discount/offer information, payment information, or online store events or information such as page views, product search information (search keywords, click-through events), product reviews, abandoned virtual shopping carts, and/or other transactional information associated with business through the e-commerce platform 100. In some embodiments, the e-commerce platform 100 may store this data in a data facility 134. Referring again to FIG. 10, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their virtual shopping cart, proceeds to checkout, and pays for the content of their virtual shopping cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementations

The methods and systems described herein may be deployed in part or in whole through a machine that executes computer software, program codes, and/or instructions on a processor. The processor may be part of a server, cloud server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In some embodiments, the process may be a dual core processor, quad core processors, other chip-level multiprocessor and the like that combine two or more independent cores (called a die).

The methods and systems described herein may be deployed in part or in whole through a machine that executes computer software on a server, cloud server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented in different devices which may operate in wired or wireless networks. Examples of wireless networks include 4th Generation (4G) networks (e.g., Long-Term Evolution (LTE)) or 5th Generation (5G) networks, as well as non-cellular networks such as Wireless Local Area Networks (WLANs). However, the principles described therein may equally apply to other types of networks.

The operations, methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another, such as from usage data to a normalized usage dataset.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above, and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention claimed is:

1. A computer-implemented method for controlling access to services, the method comprising:
   receiving, from a first client of a plurality of clients, a first request to access a first service of a plurality of services, the first service associated with a first bulkhead;
   determining that a first count of concurrent active requests to the first service via the first bulkhead is equal to a first bulkhead maximum value and consequently refusing access to the first service via the first bulkhead; and
   responsive to determining that the first count of concurrent active requests to the first service via the first bulkhead is equal to the first bulkhead maximum value:
      determining that a second count of concurrent active requests via a shared burst bulkhead is less than a shared burst maximum value, the second count of concurrent active requests corresponding to concurrent active requests to any of the plurality of services via the shared burst bulkhead; and,
      responsive to determining that the second count of concurrent active requests to any of the plurality of services via the shared burst bulkhead is less than the shared burst maximum value, routing the first request to the first service via the shared burst bulkhead.

2. The computer-implemented method of claim 1,
   wherein the first bulkhead maximum value represents a number of first bulkhead tickets available for active requests to the first service via the first bulkhead;
   wherein the shared burst maximum value represents a number of shared burst tickets available for active requests to any of the plurality of services via the shared burst bulkhead;
   wherein determining that a first count of concurrent active requests to the first service via the first bulkhead is equal to a first bulkhead maximum value includes determining that all of the first bulkhead tickets are reserved; and
   wherein determining that a second count of concurrent active requests to any of the plurality of services via a shared burst bulkhead is less than a shared burst maximum value includes determining whether there is at least one shared burst bulkhead ticket available.

3. The computer-implemented method of claim 2, wherein routing the first request to the first service via the shared burst bulkhead includes reserving one of the at least one shared burst bulkhead tickets by the first request.

4. The computer-implemented method of claim 3, further comprising:
   receiving notification that the first request has been completed; and
   releasing said one of the at least one shared burst bulkhead tickets.

5. The computer-implemented method of claim 1, further comprising:
   receiving, from a second client of a plurality of clients, a second request to access a second service having a second bulkhead associated with the second service;
   determining that a first count of concurrent active requests to the second service via the second bulkhead is less than a second bulkhead maximum value; and, in response,
   routing the second request to the second service via the second bulkhead.

6. The computer-implemented method of claim 1, further comprising:
   receiving, from a second client of a plurality of clients, a second request to access a second service having a second bulkhead associated with the second service;
   determining that a first count of concurrent active requests to the second service via the second bulkhead is less than a second bulkhead maximum value; and, in response,
   routing the second request to the second service via the second bulkhead;
   wherein routing the second request to the second service via the second bulkhead includes reserving a second shared burst bulkhead ticket by the second request.

7. The computer-implemented method of claim 1, further comprising:
   receiving, from a third client of the plurality of clients, a third request to access the first service;
   determining that the first count of concurrent active requests to the first service via the first bulkhead is equal to the first bulkhead maximum value and consequently refusing access to the first service via the first bulkhead; and
   responsive to determining that the first count of concurrent active requests to the first service via the first bulkhead is equal to the first bulkhead maximum value:
      determining that the second count of concurrent active requests via the shared burst bulkhead is equal to the shared burst maximum value and consequently refusing access to the first service via the shared burst bulkhead; and
      responsive to determining that the second count of concurrent active requests via the shared burst bulkhead is equal to the shared burst maximum value, refusing the third request to access the first service.

8. The computer-implemented method of claim 7, further comprising:

receiving, from the third client of the plurality of clients, a fourth request to access the first service;

determining that the first count of concurrent active requests to the first service via the first bulkhead is equal to the first bulkhead maximum value and consequently refusing access to the first service via the first bulkhead; and responsive to determining that the first count of concurrent active requests to the first service via the first bulkhead is equal to the first bulkhead maximum value:

determining that the second count of concurrent active requests via the shared burst bulkhead is less than the shared burst maximum value; and, responsive to determining that the second count of concurrent active requests via the shared burst bulkhead is less than the shared burst maximum value:

routing the fourth request to the first service via the shared burst bulkhead;

determining, after a time period, that the fourth request to access the first service has been unable to connect with the first service;

receiving, from the third client of the plurality of clients, a fifth request to access the first service; and responsive to determining, after a time period, that the fourth request to access the first service has been unable to connect with the first service, refusing the fifth request to access the first service.

9. The computer-implemented method of claim 1, wherein the computer-implemented method operates as a single-threaded process.

10. The computer-implemented method of claim 1, wherein the first bulkhead maximum value represents an initial value of a first bulkhead counting semaphore;

wherein the shared burst maximum value represents an initial value of a shared burst counting semaphore;

wherein determining that a first count of concurrent active requests to the first service via the first bulkhead is equal to a first bulkhead maximum value includes determining that a current value of the first bulkhead counting semaphore is equal to zero; and wherein determining that a second count of concurrent active requests to any of the plurality of services via a shared burst bulkhead is less than a shared burst maximum value includes determining that a current value of the shared burst counting semaphore value is greater than zero.

11. A computing system, comprising:

a processor;

a memory coupled to the processor, the memory storing computer-executable instructions that, when executed, configure the processor to:

receive, from a first client of a plurality of clients, a first request to access a first service of a plurality of services, the first service associated with a first bulkhead;

determine that a first count of concurrent active requests to the first service via the first bulkhead is equal to a first bulkhead maximum value and consequently refusing access to the first service via the first bulkhead; and responsive to determining that the first count of concurrent active requests to the first service via the first bulkhead is equal to the first bulkhead maximum value:

determine that a second count of concurrent active requests via a shared burst bulkhead is less than a shared burst maximum value, the second count of concurrent active requests corresponding to concurrent active requests to any of the plurality of services via the shared burst bulkhead; and, responsive to determining that the second count of concurrent active requests to any of the plurality of services via the shared burst bulkhead is less than the shared burst maximum value, route the first request to the first service via the shared burst bulkhead.

12. The computer system of claim 11, wherein the first bulkhead maximum value represents a number of first bulkhead tickets available for active requests to the first service via the first bulkhead;

wherein the shared burst maximum value represents a number of shared burst tickets available for active requests to any of the plurality of services via the shared burst bulkhead;

wherein determining that a first count of concurrent active requests to the first service via the first bulkhead is equal to a first bulkhead maximum value includes determining that all of the first bulkhead tickets are reserved; and wherein determining that a second count of concurrent active requests to any of the plurality of services via a shared burst bulkhead is less than a shared burst maximum value includes determining whether there is at least one shared burst bulkhead ticket available.

13. The computer system of claim 12, wherein routing the first request to the first service via the shared burst bulkhead includes reserving one of the at least one shared burst bulkhead tickets by the first request.

14. The computer system of claim 13, wherein the instructions, when executed, further configure the processor to:

receive notification that the first request has been completed; and release said one of the at least one shared burst bulkhead tickets.

15. The computer system of claim 11, wherein the instructions, when executed, further configure the processor to:

receive, from a second client of a plurality of clients, a second request to access a second service having a second bulkhead associated with the second service;

determine that a first count of concurrent active requests to the second service via the second bulkhead is less than a second bulkhead maximum value; and, in response, route the second request to the second service via the second bulkhead.

16. The computer system of claim 11, wherein the instructions, when executed, further configure the processor to:

receive, from a second client of a plurality of clients, a second request to access a second service having a second bulkhead associated with the second service;

determine that a first count of concurrent active requests to the second service via the second bulkhead is less than a second bulkhead maximum value; and, in response, route the second request to the second service via the second bulkhead;

wherein routing the second request to the second service via the second bulkhead includes reserving a second shared burst bulkhead ticket by the second request.

17. The computer system of claim 11, wherein the instructions, when executed, further configure the processor to:

receive, from a third client of the plurality of clients, a third request to access the first service;

determine that the first count of concurrent active requests to the first service via the first bulkhead is equal to the first bulkhead maximum value and consequently refusing access to the first service via the first bulkhead; and responsive to determining that the first count of concurrent active requests to the first service via the first bulkhead is equal to the first bulkhead maximum value:

determine that the second count of concurrent active requests via the shared burst bulkhead is equal to the shared burst maximum value and consequently refusing access to the first service via the shared burst bulkhead; and responsive to determining that the second count of concurrent active requests via the shared burst bulkhead is equal to the shared burst maximum value, refuse the third request to access the first service.

18. The computer system of claim 17, wherein the instructions, when executed, further configure the processor to:

receive, from the third client of the plurality of clients, a fourth request to access the first service;

determine that the first count of concurrent active requests to the first service via the first bulkhead is equal to the first bulkhead maximum value and consequently refusing access to the first service via the first bulkhead; and responsive to determining that the first count of concurrent active requests to the first service via the first bulkhead is equal to the first bulkhead maximum value:

determine that the second count of concurrent active requests via the shared burst bulkhead is less than the shared burst maximum value; and, responsive to determining that the second count of concurrent active requests via the shared burst bulkhead is less than the shared burst maximum value:

route the fourth request to the first service via the shared burst bulkhead;

determine, after a time period, that the fourth request to access the first service has been unable to connect with the first service;

receive, from the third client of the plurality of clients, a fifth request to access the first service; and responsive to determining, after a time period, that the fourth request to access the first service has been unable to connect with the first service, refuse the fifth request to access the first service.

19. The computer system of claim 11, wherein the first bulkhead maximum value represents an initial value of a first bulkhead counting semaphore;

wherein the shared burst maximum value represents an initial value of a shared burst counting semaphore;

wherein determining that a first count of concurrent active requests to the first service via the first bulkhead is equal to a first bulkhead maximum value includes determining that a current value of the first bulkhead counting semaphore is equal to zero; and wherein determining that a second count of concurrent active requests to any of the plurality of services via a shared burst bulkhead is less than a shared burst maximum value includes determining that a current value of the shared burst counting semaphore value is greater than zero.

20. A non-transitory, computer-readable medium storing computer-executable instructions that, when executed by a processor, are to cause the processor to:

receive, from a first client of a plurality of clients, a first request to access a first service of a plurality of services, the first service associated with a first bulkhead;

determine that a first count of concurrent active requests to the first service via the first bulkhead is equal to a first bulkhead maximum value and consequently refusing access to the first service via the first bulkhead; and responsive to determining that the first count of concurrent active requests to the first service via the first bulkhead is equal to the first bulkhead maximum value:

determine that a second count of concurrent active requests via a shared burst bulkhead is less than a shared burst maximum value, the second count of concurrent active requests corresponding to concurrent active requests to any of the plurality of services via the shared burst bulkhead; and, responsive to determining that the second count of concurrent active requests to any of the plurality of services via the shared burst bulkhead is less than the shared burst maximum value, route the first request to the first service via the shared burst bulkhead.

* * * * *